(12) United States Patent
Meier et al.

(10) Patent No.: US 6,415,303 B1
(45) Date of Patent: Jul. 2, 2002

(54) METHOD AND SYSTEM FOR DESCRIBING FUNCTIONALITY OF AN INTERACTIVE MULTIMEDIA APPLICATION FOR USE ON AN INTERACTIVE NETWORK

(75) Inventors: John R. Meier, Longmont; Peter J. Welter; Donald Kasica, both of Boulder; Prabu Raman, Broomfield, all of CO (US)

(73) Assignees: MediaOne Group, Inc., Englewood; US West, Inc., Denver, both of CO (US)

( * ) Notice: Subject to any disclaimer, the term of this patent is extended or adjusted under 35 U.S.C. 154(b) by 1288 days.

(21) Appl. No.: 08/659,429

(22) Filed: Jun. 6, 1996

Related U.S. Application Data

(63) Continuation of application No. 08/372,159, filed on Jan. 3, 1995, now abandoned.

(51) Int. Cl.⁷ .............................................. G06F 15/00
(52) U.S. Cl. ...................... 707/500.1; 345/723; 386/4
(58) Field of Search ................................ 395/806, 807, 395/762, 774; 345/302

(56) References Cited

U.S. PATENT DOCUMENTS

| | | | | |
|---|---|---|---|---|
| 5,287,199 A | * | 2/1994 | Zoccolillo | 358/402 |
| 5,344,132 A | * | 9/1994 | LeBrun et al. | 271/35 |
| 5,404,411 A | * | 4/1995 | Banton et al. | 382/54 |
| 5,455,910 A | * | 10/1995 | Johnson et al. | 395/153 |

OTHER PUBLICATIONS

DeRose et al., Making Hypermedia Work: A User's Guide to HyTime, pp. 77–100, 295–319, Jan. 1994.*

Goldfarb, "HyTime: A Standard for structured hypermedia interchange", Computer, v. 24, n. 8, pp. 81–84, Aug. 1991.*

Markey, "HyTime and MHEG", COMPCON Spring 1992, pp. 25–40, Feb. 1992.*

Buford et al., "Integrating object-oriented scripting languages with HyTime", Proc. of Intl. Conf. on Multimedia Computing Systems, pp. 425–434, May 1994.*

Erfle, "HyTime as the Multimedia Document Model of Choice", Proc. of Intl. Conf. on Multimedia Computing Systems, pp. 445–454, May 1994.*

Bryan, "Document Markup for Open Information Interchange", IEE Colloquium on 'Adding Value to Documents with Markup Languages', pp. 3/1–3. Jun. 1994.*

Thomas et al., "Diamond: A Multimedia Message System Built on a Distributed Architecture", *Computer* (Dec. 1985), pp. 65–78.*

Macromedia, Inc., *Authorware Professional Users Guide*, version 2.0 for Macintosh, pp. 164–171 (1992).*

DeRose et al., "Making Hypermedia Work: A User's Guide to HyTime", pp. 77–100, 253–274, 295–319, Jan. 1994.*

* cited by examiner

*Primary Examiner*—John Breene
(74) *Attorney, Agent, or Firm*—Brooks & Kushman, P.C.

(57) ABSTRACT

A method is disclosed for describing functionality of an interactive multimedia application for use on an interactive network. The method includes the step of storing at least one composite description in an ASCII text file. The composite description describes a single multimedia presentation. The composite description includes at least one composite item selected from the group consisting of text, box, font, graphic, video, audio, animation and list. A system is also disclosed for implementing the steps of the method.

1 Claim, 3 Drawing Sheets

METHOD AND SYSTEM FOR DESCRIBING FUNCTIONALITY OF AN INTERACTIVE MULTIMEDIA APPLICATION FOR USE ON AN INTERACTIVE NETWORK

CROSS-REFERENCE TO RELATED APPLICATIONS

This application is a continuation of U.S. patent application Ser. No. 08/372,159, filed Jan. 3, 1995 now abandoned, which is related to U.S. patent application Ser. No.: 08/915,188, entitled "Method And System For Preloading Prefetch Data Of A Multimedia Application In An Interactive Network," which is a continuation of Ser. No. 08/372,152, now abandoned; Ser. No. 08/372,153, entitled "Method For Automatically Collecting Semantic Event Data In An Interactive Network," now U.S. Pat. No. 5,752,159; Ser. No. 08/372,157, entitled "Method And System For Managing Multimedia Assets For Proper Deployment On Interactive Networks," now U.S. Pat. No. 5,748,956; and Ser. No. 08/659,430, entitled "Method And System For Developing Interactive Multimedia Applications For Use On An Interactive Network," which is a continuation of Ser. No. 08/372,158, now abandoned. The related applications are commonly assigned to the assignee of the present application and are hereby incorporated by reference.

TECHNICAL FIELD

This invention relates generally to methods for describing multimedia applications and executing such applications on an interactive network.

BACKGROUND ART

Recently, the deployment of interactive networks, including broadband television and computer networks, is occurring at a rapid pace. This increase in the number of interactive networks has created a need for the rapid development of accompanying multimedia applications to be executed on such networks.

Traditionally, multimedia applications have included audio/video assets and have been developed using a low level language such as C or C++. Although authoring packages have provided the facility to develop portions of applications in higher level languages, the prior art still relies on custom programming to support the entire application.

As a consequence of their low level and customized nature, employing the prior art methods to develop multimedia applications is not only time consuming but also results in applications which are difficult to support. Further, the multimedia applications developed using the prior art methods are customized to operate on specific hardware.

DISCLOSURE OF THE INVENTION

In view of the prior art, a need exists for a method for more efficiently defining multimedia applications which may be executed at a client station.

It is an object of the present invention to provide a method for describing the functionality of a multimedia application which results in reduced development time.

It is another object of the present invention to provide a method for developing a multimedia application which may be executed at a client station regardless of the hardware manufacturer.

In carrying out the above objects and other objects of the present invention, a method is provided for describing present invention, functionality of an interactive multimedia application for use on an interactive network. The method includes the step of storing at least one composite description in an ASCII text file.

The composite description describes a single multimedia presentation. Further, the composite description includes at least one composite item selected from the group consisting of text, box, font, graphic, video, audio, animation and list. Preferably, the composite description also includes at least one event handler selected from the group consisting of timerEventHandler, buttonEventHandler, streamEventHandler and compositeEventHandler.

The present invention provides many advantages over the prior art. These advantages include more efficient application development; portability of applications; improved facility for error detection; and automated generation of applications (i.e. from asset databases).

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
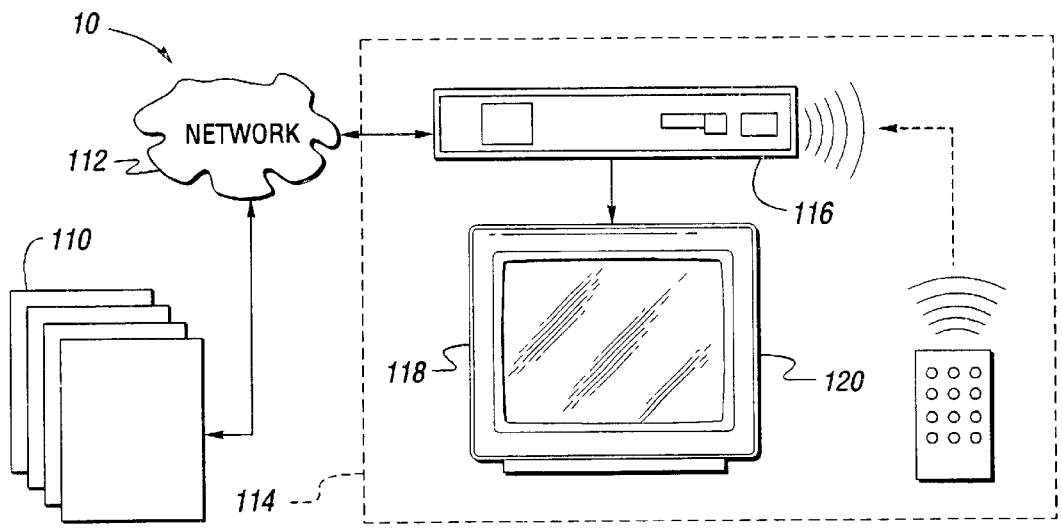
FIG. 1 is a schematic block diagram of the environment in which the present invention is used.

Referring now to the drawings, FIG. 1 is a schematic block diagram illustrating an interactive television ("ITV") system 10 for use with the present invention. System 10 includes at least one ITV server 110 for use with an ITV network 112. ITV server 110 is connected through ITV network 112 with client station 114.

There are a number of equipment manufacturers who produce commercially available equipment which could function as ITV server 110. In fact, the control logic employing the method of the present invention has been successfully implemented on DEC Alpha AXP processors running DEC OSF/1; SGI mips-based processors running IRIX; and SUN processors running SunOS.

The control logic has been implemented in both C and C++. If necessary, it could be easily ported to other UNIX platforms.

Client station 114 includes set top terminal 116, television 118 and remote controller 120. Preferably, set top terminal 116 would be either a Time-Warner full service network Home Communications Terminal ("HCT") or a 3DO set top terminal. The Time Warner HCT employs a MIPS R4000 chip running at 80–100 MHz and incorporates Silicon Graphics Indigo Workstation components.

The 3DO set top terminal employs a proprietary 3DO chip set. The control logic communicating with the 3DO set top terminals conform to the 3DO RPC Folio, as described in the "3DO Network Developer's Guide—Preliminary Draft", dated July, 1994.

Both terminals, Time Warner and 3DO, are capable of receiving digital full-motion video, animation, graphics and audio data. Both terminals are further capable of converting this digital information into an analog signal for transmission to television 118.

Client station 114 further includes an input device 120. Preferably input device 120 is an infrared remote control including a number of alpha-numeric keys. Alternatively, input device 120 could be an infrared mouse.

As those skilled in the art will recognize, system 10 is an interactive television network employing a client-server architecture. ITV server 110 provides mass storage and services to client station 114. Control logic resides at both server 110 and client station 114 to support the client-server architecture.

Although the preferred server 110 and client station 114 are part of an interactive television system, the present invention is not limited to such an embodiment. For example, client station 114 could be a kiosk or personal computer without adversely affecting the utility of the present invention.

Figure 2:
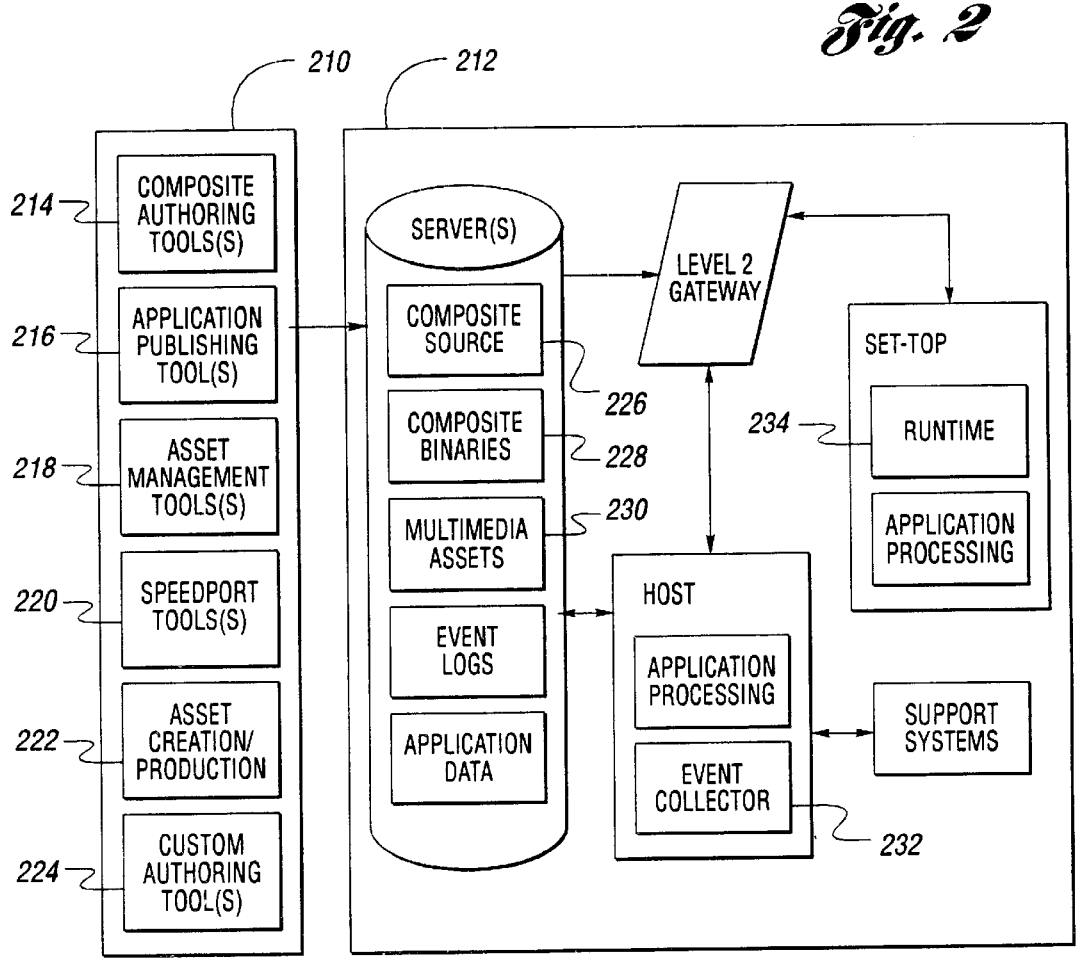
FIG. 2 is a schematic block diagram illustrating the preferred architecture of an interactive television network employing the development method of the present invention.

Referring now to FIG. 2, there is shown a schematic block diagram illustrating the architecture of the Information Services Infra-Structure ("ISIS") employing the application development method of the present invention. ISIS provides a set of interoperable software tools for developing and executing interactive multimedia applications for delivery on a variety of consumer electronic devices over a variety of broadband networks.

The ISIS architecture includes two categories of software components: development components 210 and runtime components 212. Development components 210 include authoring and application publishing tools for building a multimedia application.

The authoring tools work with existing asset creation and production tools such as Adobe Photoshop, Adobe Premier, and SoundEdit Pro which can be used to create videos, graphics, audio, and fonts. An authored application can be compiled and tested it in either a standalone Macintosh configuration or a client/server environment over a network. The application publishing tools move the application from a standalone environment to a server environment and to the eventual deployment/production environment.

The ISIS runtime components 212 are responsible for executing an authored application. ISIS runtime components 212 provides the execution environment for the application in a client/server environment where the client device is a consumer set top terminal. In order to support emerging consumer set top terminals, as well as Macintoshes and PCs, the developed applications are portable.

The initial focus of ISIS was to deliver 3DO runtime software for the U S WEST Broadband network trial in Omaha, Nebr., in the fourth quarter of 1994. A Macintosh version of the runtime components is also supported to allow testing of applications without expensive 3DO or DEC development hardware and software.

Composite Authoring Tool (CAT)

Figure 3:
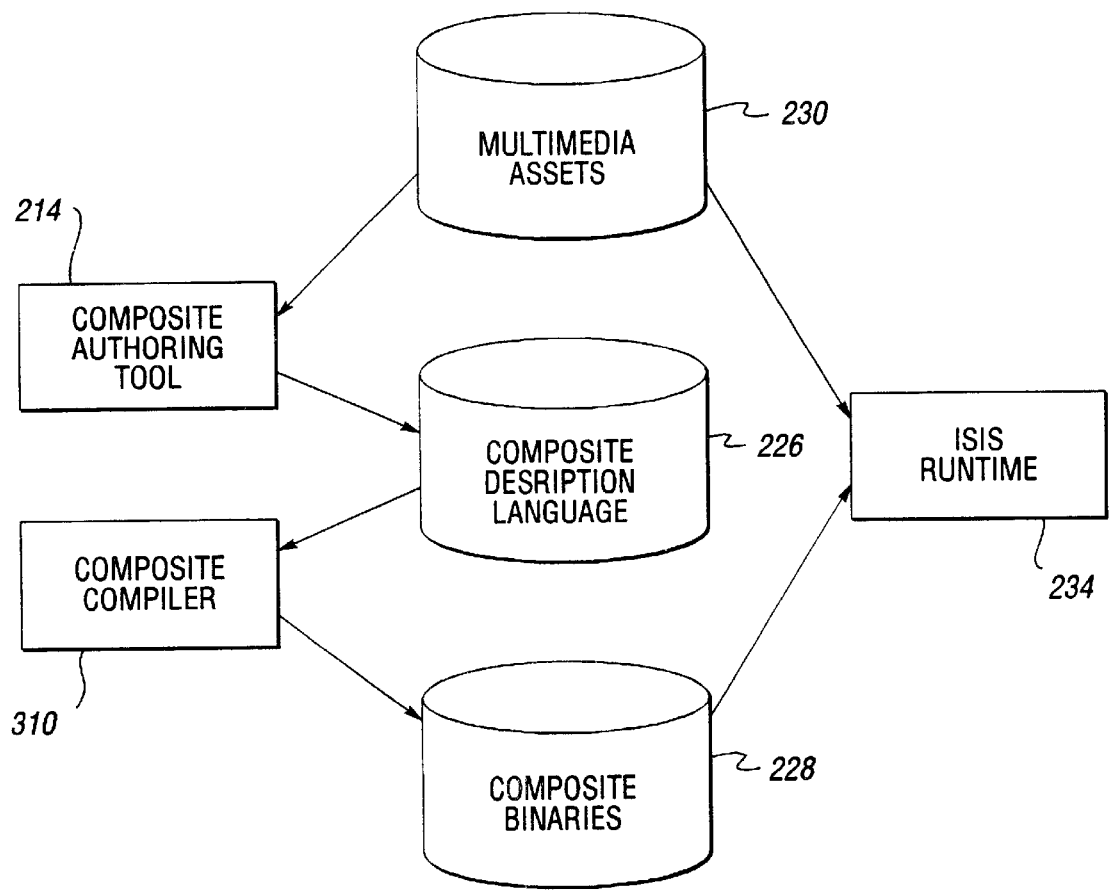
FIG. 3 is a schematic block diagram illustrating the relationship between various file formats and the runtime component of a set top terminal.

Referring now to FIG. 3, there is illustrated the relationship between CAT 214, composite compiler 310, various file formats and the ISIS runtime component module 234 of set top terminal 114. CAT 214 is an authoring tool that runs on the Macintosh and defines the compositing of multimedia assets (i.e. video, graphics, audio, and text) into interactive multimedia applications. CAT 214 provides an integrated graphical layout editor, a forms editor, and a testing environment.

With the layout editor, display objects can be easily defined and laid out in a window that represents a television screen. Each display object also has a detail forms window in which additional object attributes can be specified.

CAT 214 provides a seamless testing environment on the Macintosh which is integrated with a composite compiler and the Macintosh version of the runtime components. CAT 214 invokes composite compiler 310 to compile the composite, and then invokes ISIS runtime module 234 to execute the composite. A new composite can be created and tested with a few clicks of the mouse.

CAT 214 delivers a source composite definition 226 and a binary composite definition 228 as output in Composite Description Language ("CDL"). CDL provides an event driven, object oriented syntax for defining a multimedia application.

CDL source files are stored in ASCII format, which makes it easy to read by any program that can read ASCII text files. CDL source files can be generated by CAT 214 and edited by custom built authoring tools or any editor capable of handling ASCII text files.

composite compiler 310 converts CDL from a source format into a more compact binary format. ISIS runtime module 234 then reads and executes the instructions of the application in this binary format.

Composite compiler 310 includes a composite optimizer which condenses multiple composite files and assets referenced by the composite to a single composite binary file. Reducing the number of physical files within the application reduces the number of file accesses the ISIS runtime module 234 must perform to execute a composite. File accesses are expensive, especially in a network environment because of network latency.

Composites, composite items, events, actions, and templates are the building blocks of CDL and any application built in ISIS.

Composite A composite is a collection of assets, events and actions assembled into a "scene" that the ISIS runtime module 234 plays back. composites can also contain other composites. To describe interactivity, a composite defines how to handle external events such as button presses on a remote control.

Composite item A composite item is a multimedia object (i.e. video, graphic, text, audio, animation or custom library) within a composite. Attributes such as screen location, transparency and audio and video looping further define composite items.

Event An event is an occurrence to which an application must react. Events can occur externally or internally to the ISIS runtime module 234. Button presses on a remote control are external events. The passage of time, entering a composite and starting a stream are internal events.

As ISIS runtime module 234 plays back a composite, it also monitors events as they occur. When an event occurs that is of interest to the executing composite, the ISIS runtime module 234 executes the actions associated with that event. An event always has at least one action associated with it.

Action CDL has predefined actions that the ISIS runtime module 234 player can perform. For example, a common action for composite items is "enable." The enable action tells the ISIS runtime module 234 to display a graphic, play an audio file, etc.

Another common action is "transition to:composite" which tells the ISIS runtime module 234 to execute the composite defined by the "transition to" action. In effect, these transitions link composites together into an application. In addition to the predefined actions that ISIS provides, a developer can write and add custom actions.

Composite Templates composites can also be templates. Any composite can take its composition from another composite simply by referencing that composite as a template. composites inherit (using a delegation mechanism) all items, events, and actions from a template.

COMPOSITE DESCRIPTION LANGUAGE

CDL source files require a syntax compatible with composite compiler. The syntax is largely free-form, but must be created using the keywords.

In addition, a number of implementation-specific terms are used throughout this application.

To illustrate the use of CDL to describe multimedia applications, consider the following example:

(composite:name "acme:shoesIntro.comp":template "acme:deptIntro.comp" (video :rectangle (0,0,340,252) :file "acme:shoesIntro.video":name "introVideo" :layer 1) (graphic :rectangle (20,20,90,60) :file "acme:shoesIntro-:marchShoeSale.bitmapn :layer 2) (streamEvent :stream "introVideo" :eventType StreamEnd :action nTransition-Ton :actionParameters "acme:shoes:spring.comp"))

In this example, the "acme:shoesIntro.comp" composite includes three composite items: a video, a graphic and an event handler. It also inherits any items in the template composite which is named "acme:deptIntro.comp." The event handler executes the action "TransitionTo" on the end of the video item—transitioning to the "acme:shoes: spring.comp" composite. This example demonstrates a graphic in layer 2 overlaying a video in layer 1. All of the items are enabled upon entry to the composite.

(composite:name "acme.comp" :template "theStreet.comp" (text :textValue "ACME Department Store" :textSize 24 :rectangle (20,210,300,30) ) :layer 9 :shared true) (audio :name "storeMusic" :file "acme:springTune.audio") :shared true) (timer :time 300:action "TransitionTo" :actionParameters "@customerAsleepCompositeItem") (value :name "customerAsleepCompositeItem") :text "acme:areYouThere.comp")

This second example, the "acme.comp" composite illustrates what appears to be a template composite to be used throughout the ACME Department Store presentation. It inherits any items from the template composite named "theStreet.comp" which, perhaps, contains application-wide items. The text item appears to contain a text logo to be displayed throughout the store, and the audio item seems to contain background music that can be shared across composite transitions. The timer appears to implement a user interface that checks with the viewer if they stay in a composite for more than five minutes (300 seconds). The associated action transitions to a composite whose name is stored in the "customerAsleepCompositeItem" value item. The use of indirect specification of the target composite allows individual composites to supply their own "customerAsleepCompositeItem" item with a text value that is different than the default ("acmeareYouThere.comp").

(composite:name "acme:bronzeWidgets.comp1":template "acme:product.comp" (video :name "video1" :rectangle (0,0,340,252) :file "acme:bronzeWidgetsDemo.video" :enabled true) (event: stream "video1" :eventType StreamEnd action "Enable" :actionParameters "video2") (event :button ButtonSelect :eventType ButtonPressed :action "Open" :actionParameters "acme: salesScreen. comp") (video :name "video2":rectangle (0, 0, 340, 252) :file "acme:bronzeWidgetsClose.video" :enabled false))

In the third example, the "acme:bronzeWidgets.comp" composite illustrates the use of enabled and disabled items. Item "video1" is initially enabled, whereas "video2" is not. The stream event handler takes care of enabling "video2" when the first video completes. Note that "video1" is implicitly disabled when it is over (StreamEnd). The button event handler opens a composite when the "Select" button is pressed. The "Open" action leaves the current composite open, overlaying it with the newly opened composite.

Templates

Each composite may reference one or more template composites. A template composite may reference its own template. The template and its templates form a "template chain".

When a composite is displayed, all the items in the composite and the template chain are displayed. When an event or handler occurs, the composite and each of the composites in the template chain are searched to find a matching handler. When an item is referenced by an item name, the composite and each of the composites in the template chain are searched for a matching item. The :override attribute can be used to change the way that the template chain is searched for event handlers.

The purpose of creating template composites is to share appearance and behavior among many different composites. It is a way to factor out the common pieces. For example, a developer might want to use a common background and set of buttons in the composites for several different products. One way to accomplish this would be to put the background and the buttons in a template composite and then reference this template from the composite for each product. In this way, each product composite would only contain items that are unique to that product. A simple template example might be:

(composite :name "Example.composite" # this composite puts up a piece of text on top of # the US West background :template "USWestBackground.composite" (text :textValue "My first composite" :rectangle (20 20 270 60))

(composite :name "Background.composite" # this composite displays a nice logo in the background (graphic :rectangle (O O 320 240) :filename "USWestLogo") # and provides a button that quits the application (text :textValue "Exit" :rectangle (100 150 270 170)) (hilite :rectangle (95 145 270 170) :action "Quit")

Application Publishing

The ISIS application publishing tools 216 are utilities that move an application between a test environment and a deployment environment. These tools move all the objects of an ISIS application including composites, video, graphic and audio files, fonts, and custom code.

Application publishing tools 216 examine composite descriptions, determine all the files that support the composites, and move the application to a staging area such as tape or disk. From the staging area, the application can be moved to a variety of environments.

ISIS also supports incremental publishing. Using incremental publishing, only those objects that have been altered since the last publishing of the application are moved. This lets the developer add new features and change content quickly.

Asset Management and Production System (AMPS)

The ISIS Asset Management and Production System (AMPS) 218 provides a set of tools for managing multimedia assets 230 and ISIS applications. AMPS 218 provides multimedia title developers with an easy and convenient way to catalog assets, perform keyword searches on assets, archive assets and publish applications. AMPS 218 moves applications and assets from a development environment to a deployment environment.

Figure 4:
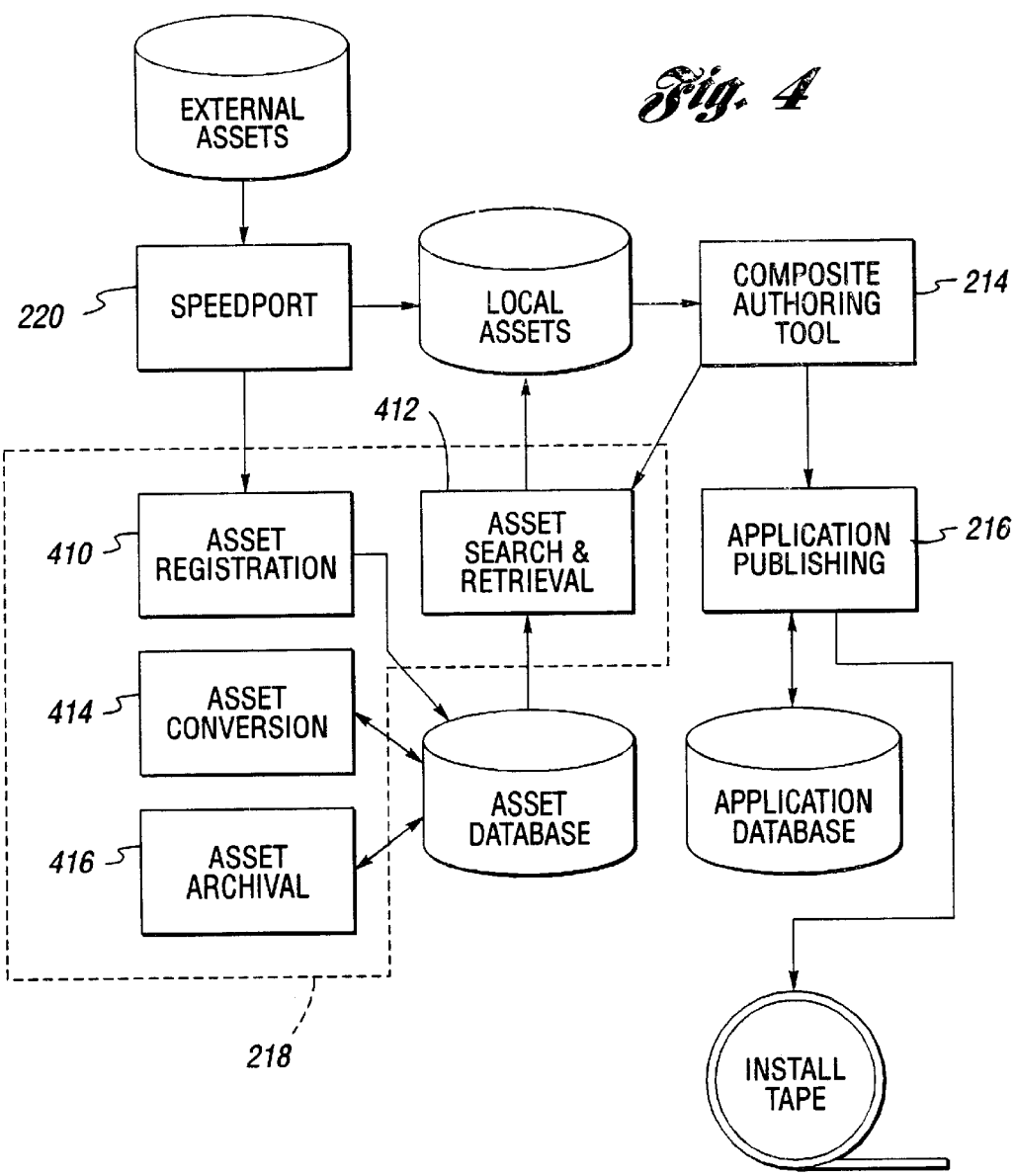
FIG. 4 is a functional block diagram illustrating the relationship between components of the Asset Management and Production System of the preferred embodiment.

Referring now to FIG. 4, there is a functional block diagram illustrating the relationship between components of AMPS 218 of the preferred embodiment.

Asset Registration

Asset registration 410 allows the developer to identify and catalog an asset or group of assets with AMPS 218. The developer can also assign keywords to the asset during the registration process. The developer can register assets manually using asset registration screens. Speedport 220 also uses the asset registration function to allow the developer to register assets in an automated fashion.

Asset Search and Retrieval

The asset search and retrieval function 412 allows the developer to perform keyword searches of the asset database. Asset retrieval supports the browsing of assets and/or using the asset within a multimedia application. CAT 214 integrates with the asset search and retrieval function 412, providing the developer an easy and convenient way to locate assets during the authoring process.

Asset Conversion

Multimedia assets come in many different formats. The ISIS asset conversion tools 414 convert assets from one format to another as specified to the conversion process. A wide variety of formats are supported, including virtually all of the more commonly used formats today.

In general, the runtime platform requires assets to be in a certain format. For example, 3DO supports a format unique to the 3DO environment, called a CEL. The asset conversion tools 414 convert assets from a wide variety of formats into 3DO cels.

Conversions can be run against a single asset or in batch against multiple assets. The converted asset is automatically registered with AMPS 218 as a new version.

Asset Archival

Asset archival 416 performs backup and recovery of assets. Asset archival 416 also moves assets off of faster magnetic disk devices to slower devices such as magnetic tape.

The archival of assets to slower devices provides significant cost benefits while still making the assets available to users of the system. Users are still able to perform keyword searches and view thumbnails on the archived asset. If the user wants to use the archived asset and it has been archived to a mounted device, AMPS 218 copies the asset back to disk. Otherwise, AMPS 218 notifies the user as to the location of the asset.

AMPS 218 also performs backup and recovery of assets to magnetic tape allowing the user to recover a previous version of an asset or restore an asset which may have been accidentally deleted.

Speedport Tools

Speedport 220 is a component of the ISIS tool set that transforms existing multimedia applications into ISIS applications. Speedport 220 provides tools to systematically extract multimedia assets from existing titles and to register those assets with AMPS 218. Speedport 220 also provides a methodology and practical guidance for converting the application into an ISIS application.

Speedport 220 speeds up the conversion of any existing multimedia application. Speedport 220 accepts a variety of digital media including CD-ROM, magnetic disk, optical drives, and digital tape.

Speedport 220 also defines a methodology or set of practices for porting application to the ISIS environment. This methodology guides the developer through the steps of moving application components from the existing environment into ISIS.

When performing asset extraction, speedport 220 first searches the existing application and identifies multimedia assets from the set of files input to speedport 220. This includes a variety of graphic, audio, and video file formats.

Next, speedport 220 converts and renames the assets into a format usable by CAT 214 and the Macintosh runtime module. speedport 220 then registers both the source and converted asset with AMPS 218. Finally, speedport 220 generates reports identifying assets extracted by type and a list of unknown types.

The ISIS development components 210 finally include an interface to standard facilities such as asset creation/production 222 and custom authoring tools 224.

ISIS Runtime Components

A major component of the ISIS runtime components 212 is the ISIS runtime module 234 which resides at client station 114. ISIS runtime module 234 reads and plays back composite binary files 228 defined during the authoring process. It reads the startup composite, waits for events to occur, and then executes the actions associated with those events.

There are three major processing components of ISIS runtime module 234: the player; the preloader and the event collector.

As the heart of the runtime module 234, the player handles the display and playback of composite items, monitors and handles events as they occur, performs actions, and communicates with the preloader and event collector as needed.

The preloader provides the ISIS runtime module 234 with an overall memory management and caching scheme whose purpose is to improve performance and to hide latency. When an application starts and the player invokes the first composite, the preloader retrieves all of the files necessary to play the composite. It then looks at the composite and loads the "next" composites based on the transitions defined in the composite that is playing.

The event collector stores all internal and external events, as they occur, in a buffer in memory at client station 114. These events can be sent to the event collector 232 on the server for logging to a file or for additional processing.

The event collector captures the event information in enough detail so that ISIS runtime module 234 can use the event logs to play back an application session exactly as it appeared to the end user. ISIS runtime module 234 is both compact and portable. Currently the total size of ISIS runtime module 234 is approximately 200 KB.

Figure 5:
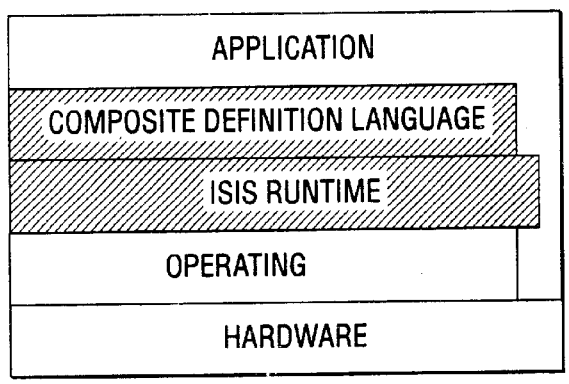
FIG. 5 is a block diagram illustrating the layered architecture employed by the preferred embodiment.

Applications developed using the ISIS development components 210 are easy to port to any client station equipped with ISIS runtime module 234. ISIS accomplishes this by providing the layered architecture shown in FIG. 5.

Applications written in CDL are hidden from the details of the hardware, operating system software, and ISIS runtime. Even if ISIS runtime runs on a client station with which the developer is unfamiliar, the CDL portion of the application runs without any changes.

There are other pieces of the application, however, that might require changes in order to execute on different client stations. The changes might include reformatting and re-encoding assets and converting fonts.

While the best mode for carrying out the invention has been described in detail, those familiar with the art to which this invention relates will recognize various alternative designs and embodiments for practicing the invention as defined by the following claims.

DEFINITIONS

Composite: A Composite describes a presentation element that can be "played" by the ISIS runtime It is stored on a server in a file identified by the filename. It includes a list of Composite Items that provide the visible and audible aspects of the presentation as well as the behavior that will be exhibited in response to events during the runtime session.

filename: A filename is a string used to uniquely identify a file on the server. The file may contain a composite, primitive multimedia asset or other application file. It must be enclosed within double quotes.

template/templates: Each composite may reference one or more template composites from which it can inherit composite items. A template composite usually contains composite items used by many different composites. If there is more than one template the items are added in the order of the templates in the list.

compositeitem: Each composite may contain any number of composite items. The different items are used to present multimedia assets and to specify responses to events in the runtime session. The items may be listed in any order, which has no bearing on the order of their processing by the runtime.

compositeItemType: Each composite item has a type which determines its handling by the runtime. The range of types provides for presenting media assets, handling events, setting timers, identifying action routines and storing static data associated with the composite.

itemName: A composite item may optionally be assigned an itemName that provides a unique identifier. The name allows actions to refer to the named item. Actions may refer to composite items for performing such operations as enabling/disabling, starting a timer and getting static data values.

enabled: Each Composite Item is either enabled or disabled. When an item is enabled, it is processed by the runtime. For example, an enabled graphic will be displayed on the screen; an enabled timer will be started. On the other hand, a disabled item is not processed. So a disabled event handler will not fire on its associated event. Event handler actions may dynamically enable and disable composite items. This optional attribute controls whether an item is processed when the composite is first entered by the runtime session. If not specified, the item is initially enabled by default.

group: A compositeItem may be tagged as part of a compositeitem group. Certain operations that act upon composite items allow a group to be specified. This is an optional attribute.

shared: This optional attribute allows a shared composite item to remain enabled whenever the runtime transitions to another composite that also contains the same item (if it is flagged as initially enabled). This allows video, audio and other stream presentations to remain open across composite transitions. This can be used to implement features such as shared background audio.

layer: The layer attribute is used to control the relative positioning of a visible or audible compositeitem. Lower number layers are "in front" of higher number layers. For visible items, a lower layer puts the item visually in front of other layers. For audio items, layers are numbered such that if two items are enabled concurrently, the item in the frontmost layer will play while the other will be muted.

transparency: The transparency attribute is used to control the how much of the background is visible beneath a visible compositeitem. This is specified as a number from 0 to 100. A value of O means the item is opaque and a value of 100 would be completely transparent. The default is 0.

transparentBlack: The transparentBlack attribute is used to determine whether black pixels in an image are visible or transparent. This is used to easily display images that have non-rectangular edges. The default is false.

override: For event composite items, the override attribute determines whether the system should continue searching in the composite and it's templates for other event items that match. The default value, extend, continues searching. The other value, replace, stops searching.

preview: For visible composite items, the preview attribute determines whether the item is drawn during the transition to the composite. The default is false. Setting this attribute gives the user feedback about the composite they are about to see without waiting for all of the items in the composite to be loaded.

box: A box composite item is used to draw a box on the screen. The rectangle attribute determines the position and size of the box. The foregroundColor attribute determines the color used to frame the box; the default foregroundColor is white. The thickness attribute determines the thickness of the frame; the default thickness is 0. The backgroundColor determines the color used to fill in the box; the default background color is transparent.

text: A text composite item is used to presetn text in a rectangle on the screen. The text is stored in character string format and is rendered using the specified font. When the item is enabled, the text will be rendered on the screen. If a background color is specified, a box is drawn behind the text in that color. The size of this box can be controlled by specifying the :rectangle, and if only a :position is specified, the box will be auto-size around the text. The foreground color is the color the text is drawn in. The :leftMargin and :topMargin allow offsetting of the text from the upper left corner of the box. Wrapping allows word-wrap inside of the defined :rectangle.

justification: This optional attribute affects the layout of text. The default, "top" and "left", causes each line of text to start at the top and left margin. The "center" option causes each line of text to be centered between the left and right margin.

lineSpacing: This optional attribute affects the spacing, in pixels, between lines of text. The amount is added to the normal line spacing for the font. The default is 0.

characterSpacing: This optional attribute affects the spacing, in pixels, between characters of text. The amount is added to the normal character spacing for the font. The default is 0.

maximumLength: This optional attribute limits the maximum number of characters that can be entered into a text input field. If the user goes over the limit, a "TextInputMaxFail" message is sent. This can be handled by a script or custom action of that name.

font: A font composite item is used to map a single string to a system dependent font specification, and ensures that the font is loaded when required. For example (font :name Geneva12 :file Geneva12.3do), where Geneva12.3do is a system specific font file. Different sizes and styles of a typographical font are different fonts in a composite. Geneva12 and Geneva14 are two completely different fonts.

color: A color is specified as an RGB (red, green, blue) triple.

graphic: A graphic is used to display a bit-map graphic in a rectangle on the screen. The graphic is stored in a file on the server in a format that depends upon the client device. This file can be specified directly in the item as a filename, or it can be indirectly obtained by specifying a value composite item which contains the filename. When the item is enabled, the graphic will be rendered on the screen.

video: A video composite item will play a video stream with associated audio. The video will appear in a visual plane on the screen. On some networks, the developer may be constrained to the very back visual plane, in which case the specification of a layer for this item will be ignored. Otherwise the layer attribute for this composite item will control the visual plane in which the video is rendered.

The video is stored in a file on the server in a format that depends upon the client device. This file can be specified directly in the item as a filename, or it can be indirectly obtained by specifying a value composite item which contains the filename. When the item is enabled, the video will be played.

The loop attibute will control whether the video plays in a continuous loop or whether it plays only once and then stops. The default is to play only once.

The keepResident attribute will control whether the set-top will try to load the entire video into memory or whether it loads the video as needed. The default is to load the video as needed.

The lastFrameStaysVisible attribute controls whether the last frame of the video remains visible on the screen when the video ends or whether it is erased. The default is to erase it.

audio: An audio composite item is used to present audio on the client device speaker. The audio is stored in a file on the server in a format that depends upon the client device. This file can be specified directly in the item as a filename, or it can be indirectly obtained by specifying a value composite item which contains the filename. When the item is enabled, the audio will be played.

The layer attribute will control the interaction between this piece of audio and any other enabled audio. When multiple audio items are enabled, the runtime will play only items in the "frontmost" layer, and will stop playing any others. If two pieces of audio are enabled in the same layer, the runtime will play only the most recently enabled item.

The loop attibute will control whether the audio plays in a continuous loop or whether it plays only once and then stops. The default is to play only once.

The keepResident attribute will control whether the set-top will try to load the entire audio into memory or whether it loads the audio as needed. The default is to load the audio as needed.

list: A list is used to display a visual menu of items. The list object is most useful when the number of items to be displayed is more than a screenful. It is specified by:

1) a starting position and a sequence of view position offsets;

2) options that control the behavior of the list;

3) an item template that specifies the look and feel that is shared by all displayed items of the list;

4) a value string that is used to instantiate the template; or 5) an optional initial state of the list.

The starting position of a list can be specified by :position or :rectangle. In any case, only the top & left value is used by the list. The :positions attribute specifies the view position offsets where list items will be displayed. The number of offsets in the sequence is the maximum number of items that will be displayed at any given time.

There are a number of options that can be used in combination to create a wide variety of list presentations. We will describe each attribute and some commonly used combinations.

If :wrapCursor is set to true, then the list behaves as a circular list with respect to cursor movements. Otherwise, an attempt to move the cursor beyond the range of list items generates a ListCursorNextFail or ListCursorPrevFail message. We will cover later how such messages can be handled in a composite.

If :wrapList is set to true, then the list behaves as a circular list as far displaying the items. When used in combination with :wrapCursor, although it does not have to be that way, it behaves as a true circular list. This attribute has no effect when enough view positions are available to display all list items.

In the default case, the list cursor moves from item to item under user control. To get a visual appearance of cursor being in a fixed position and the list moving beneath it, set :fixedCursor to true. In that case, :fixedCursorIndex should be set to the index (starting from 0) of the view position that will have the fixed cursor.

The list handles a number of messages which we will discuss later. On of them is ListDelete which is sent to the item that has the cursor. The item that gets this message is then marked as disabled. If the item was already disabled, then a second ListDelete message enables the item. However, if :hideDisable attribute is set to true, then disabled items are not displayed. There is no possibility of reenabling a hidden item because it can never get the cursor.

A list item that has the cursor can be selected by sending a ListSelect message. In the default case, any number of items can be selected. However, if :singleSelect is set to true, then at most one item can be selected. Any previously selected items are deselected.

In a list that does not have fixedCursor attribute set, the following attributes are meaningful. If the :autoScrollMargin is 0, which is default, then there is no autoscrolling. Only when cursor is moved to an item that is not displayed the list is scrolled to bring the cursor item into view. For a positive value of autoScrollMargin, whenever the cursor moves to an item that is within the specified margin from top or bottom of the list, the list is scrolled by :autoScrollCount items in the direction of cursor movement. Another control parameter for a list is the amount of "white space" or unfilled view positions that are remaining at either end. The :maxWhiteSpaceBelow and :maxWhiteSpaceAbove attributes are used to limit the maximum amount of white space below and above a list. The list is scrolled up or down to satisfy the constraints. When both constraints are violated, the maxWhiteSpaceAbove constraint takes precedence.

Regarding the :itemTemplate attribute of list, the template specifes a set of elements which taken together account for the behaviour of the item. There is no limit to the number of elements in itemTemplate. Each element references and controls a composite item. The element has a condition, :cond, under which it will fire, and then the composite item it control is enabled. When the condition does not hold, the composite item is disabled. There are two kinds of conditions, edge and state conditions. The edge conditions are OnAction and those that end,with "In" suffix, and they fire the first time the condition becomes true. The remaining conditions are state conditions and they fire as long as the condition holds true. Typically, edge conditions are used to trigger time-based composites items, such as audio, video, animation, and state based conditions are used to trigger non-time-based assets such as text, graphic, and box. If the :offset attribute is specified in an element, and if the element has a visual property, then when that asset is enabled it is displayed at an offset relative to the position of the item. Otherwise, the asset is displayed at the absolute position given in that composite item.

The list creates an instance of the item template for each item in the list. How does the list know how many items it has to create, and what do we do if we want to have different value for an element in each instance of the item template. Both these are provided by :itemValues attribute. Its value is either a string or a reference (~) to a value item that contains the value string. The value string has a new-line separated substring for each item in the list. So the number of such substrings is the number of items in the list. Now, each substring can in turn be made up of zero or more tab separated substrings that provide a value for instances of elements that have requested a value. The way the list knows whether a list element needs a value is if the field it refers to has a indirection "~" in an appropriate attribute of the field. For each type of field the list checks a predetermined attribute for indirection, or no attribute can be indirected. For text and :textInput fields, it is the textvalue attribute. For timeEvent field, it is the first action parameter. For graphic, audio, video and animation it is the file attribute. Box, List, and Script fields cannot have any indirected attribute.

The initial state of the list can be specified in the :initialState attribute. The value of initialState is a state string, or a reference to value item that contains the state string. The state string contains a single alphabet for each list item that has the encoded state of the item. The encoding is as follows. Upper case means the item is enabled, and lower case means disabled. Once that information is extracted, the remaining encoding is case insensitive.

C=>cursor item
B=>cursor item+selected
A=>cursor item+selected+first visible item
S=>selected
T=>selecetd+first visible item
Y=>first visible item
X=>first visible item+cursor item If the initialState attribute is indirected to a value item, then the current state of the list is also written out to the value item when either a ListSaveState message is sent to the list or the list is disabled.

Trigger Conditions

Each element in an item template has a trigger condition. A trigger condition can be based on state (eg. OnCursor, OnSelect), or negation of a state (OnCursorNot, OnSelectNot), or on state transition (eg. OnCursorIn, OnSelectIn). If the item is not visible then it does not process any messages. When an item becomes visible it is sent a OnVisibleIn+OnVisible message. When an item is sent a message it checks all its elements and the ones that are triggered by the message enable a composite item they refer to. If the trigger is based on a state and the state no longer holds, then the referenced composite item is disabled. At some point when the item goes out of view (by scrolling or hiding) all composite items referenced by its elements are disabled.

The set of trigger conditions include:

OnCursor state based trigger that fires as long as item has cursor

OnCursorIn transition trigger that fires when an item gets cursor. If the list scrolls without changing the scroll item, this condition will not be satisfied whereas OnCursor will be. This will normally control a composite item with a time based asset such as audio.

OnCursorNot state based trigger that will fire as long as item does not have cursor. This is useful in creating a unique visual appearance for cursor item triggered on OnCursor and all other items having a normal appearance an triggered on OnCursorNot.

OnSelect
OnSelectIn
OnSelectNot
Onenable
OnEnableIn
OnDisable
OnDisableIn
OnAction
OnToggle
OnToggleNot
OnVisible
OnVisibleIn
OnWrapAbove last viewable item of the list that is wrapped gets this message
OnWrapBelow first viewable item of the list that is wrapped gets this message. When both the first and last viewable items are visible, the item that is across the boundary from the cursor is sent a wrap above/below message as appropriate.

OnWrap triggered on either wrap above or below.

hilite: A hilite composite item is used to designate an item on the screen and the associated action that should be taken when the item is chosen is activated. Pressing the arrow buttons moves between hilites. When a hilite is selected, the hilite's item is enabled. When the hilite is chosen, the action for the hilite is performed.

script: A script is a sequence of action/parameter pairs. A script is run when an action occurs that matches the name of the script. It is used when you want an event to cause several actions instead of only one.

timer: A timer composite item is used to set a timer and specify the associated action that should be taken when the timer expires. The timer is started when first enabled and is disabled when it expires. A timer can also be disabled before it expires. The time value specifies the expiration time, in seconds, following the enabling of the timer.

transition: A transition item is used to specify how a composite or composite item is visually enabled or disabled. The name of the transition is passed as a parameter to Enable, Disable, or TransitionTo. The type attribute determines which of several transitions is used. The frames parameters determines the length of the transition. Some of the transition types use additional parameters. Transition types include None, Zoom, Slide, FadeBlack, and Wipe.

buttonEventHandler: A button event handler item specifies the associated action that should be taken when a button event occurs in the runtime session. The developer specifies the event type and the button as well as any parameters that should be passed to the action.

streamEventHandler: A stream event handler item specifies the associated action that should be taken when a stream event occurs in the runtime session. The developer specifies the event type and the stream composite item (video or audio) as well as any parameters that should be passed to the action. Stream marker events allow the developer to trigger an action when a marker embedded in the stream is encountered by the stream playback system. For these type of events, one must also specify a string that identifies the marker that is to be trapped. Note that some networks may not support the embedding of markers in the stream assets.

compositeEventHandler: A composite event handler item specifies the associated action that should be taken when a composite is entered (opened) or exited (closed) by the runtime session. The developer specifies the event type as well as any parameters that should be passed to the action.

transition: A transition item specifies a visual transition effect that should be used when a new composite is opened. The developer references the transition item when calling the Open and TransitionTo actions.

library: A library composite item provides a mechanism for adding actions to the action name space of a composite. The enclosing composite and any composites that delegate behavior to the enclosing composite, will look first in this library for an action when the library item is enabled. Disabling a library item removes the actions it contains from the name space. This type of item will be primarily useful to template composites.

custom: A custom composite item is used to store or reference application-specific data. It can store one of three types of data: character strings, binary data or a filename.

value: A value composite item provides a level of indirection between a reference to a file or string value and the actual filename or string. This is useful, for instance, when creating template composites. Actions in a template can reference a value item for such things as the filename associated with a video. Other composites can then provide and populate the value item with data (e.g. a filename) that is specific to their needs.

textinput: A textInput composite item is used to present a single line of editable text in a rectangle on the screen. It has some attributes in common with a text item, namely, font, foreground and background color, which are used just as in a text item. The textValue attribute is used to set the initial text. A textItem maintains a cursor indicating the current editing position in the line. The initial position of the cursor is before the first character in the input text. The cursor can be moved a single position to the left or right by sending "CursorLeft" or "CursorRight" action respectively to the textInput item. A "Backspace" action deletes the character to the left of the cursor. Currently, a textInput item accepts numeric input only, which is mapped to Button0 through Button9. The input number is inserted to the right of the cursor. When the password attribute is set to true, an asterisk is displayed for each character. This is useful for entering a password. If the inputType is alphaNumeric, then the numeric input is converted to letters, using the mappings on a telephone keypad.

animation: A animation composite item is used to present an animation. The framesPerSec attribute takes a floating point number as its value so that you can use values like 0.5.

LIST OF IMPLEMENTED ACTIONS

| Action | Parameters | Description |
| --- | --- | --- |
| Open | Composite | Opens the composite in addition to (layered on top of) any currently open composites. |
| Close | Composite | Close the composite without affecting any other currently open composites. |
| Transition To | Composite [transition] | Close all of the current composites, and open the specified composite. In between, display the transition. |
| Enable | nameString [transition] | Enable the item in the composite whose name is nameString. |
| Disable | nameString [transition] | Disable the item in the composite whose name is nameString. |
| EnableGroup | groupNameString | Enable all the items whose group is groupNameString. |
| DisableGroup | groupNameString | Disable all the items whose group is groupNameString |
| LogUserEvent | userEventString | Log an application specific event string. |
| Quit | result | Quit the runtime returning result to the app that started the runtime. |
| SetValue | valueName value | Dynamically set a value. |
| GoBack | | Go back to the previous composite. |

The following actions provide access to an application running on the server.

| | | |
| --- | --- | --- |
| ServerConnect | serverAppName | Create a connection to an application running on a server. |
| ServerSend | serverAppName action parameters resultValueName | Send action and parameters to a server, wait for a reply, and store the result in resultValueName. |
| ServerSendAsync | serverAppName action parameters callbackName callbackParams | Send action and parameters to a server. When the reply arrives, pass to reply and callbackParams to the callAction. |
| ServerDisconnect | serverAppName | Remove a connection to an application running on a server. |

The following actions provide playback controls for video streams. They are not normally used by an application because this is provided as part of the system template composite.

| | | |
| --- | --- | --- |
| StreamPause | streamName | Action to pause streamName if it is playing or start if it is paused. |
| StreamRewind | streamName | Action to rewind streamName. |
| StreamGoto | streamName markerName | Action to move the streamName to markerName ("start" and "end" are predefined markers for all streams). |
| StreamVolume | streamName volume | Change the playback volume of a stream (volume goes from 0–11). |
| StreamFastForward | streamName | Action to fastForward streamName. |

The following actions are not normally used by an application. They may be useful for debugging.

| | | |
| --- | --- | --- |
| DumpDeep | [compositeName] | Print composite and all of its templates. |
| DumpTimers | | Print the list of active timers. |
| Print | text | Print text to standard output. |
| Debug | | Enter the 3DO debugger. |
| PressButton | | Simulate hitting a button on the remote control. |
| DumpMem | | Print the list of heap blocks. |
| Reload | [compositeName] | Reload the composite and contents from the server, default is the current composite. |
| Help | | Print a list of Actions. |
| Dump | | Debug action to print current composite to debug window. |
| DumpRemote | | Debug action to print remote object table of contents to debug window. |
| DumpHistory | | Debug action to print history of recent composites to debug window. |

The following actions are not normally used by an application. They are normally sent by the server to control how events are logged.

| | | |
| --- | --- | --- |
| SendEvents | address | Send all events to address as they occur. |
| LogEnable | | Start logging events. |
| LogDisable | | Stop logging events. |
| LogFlush | | Request that the log be written to storage. |
| LogAll | | Log all events executed. |
| LogEvents | | Log only the low lever user and time events. |
| LogActions | | Log only the high level actions executed. |

USW 0218 PUS             -22-                    1197

COMPOSITE DESCRIPTION LANGUAGE KEYWORDS

```
composite
        ( composite :name compositeName
        [:templates (compositeName*)]
 5      [:infoItem infoItems]
        [compositeItem~]

compositeItem
        text |graphic |video |audio |list |hilite
        |timerEventHandler |buttonEventHandler
10      |streamEventHandler
        |compositeEventHandler
        |transition |library |font |custom |value
        |textInput itemAttributes
15      [:name itemNameString]
        [:enabled boolean]
        [:group string ]
        [:shared boolean]
        [:layer integer]
20      [:transparentBlack boolean]
        [:transparency integer]
        [:override inheritanceType]
        [:preview boolean]
```

USW 0218 PUS          -23-                                    1197

[:infoItem infoItems]

text
              (text
                      itemAttributes
 5                    :textValue stringRefnce:
                      :font itemNameString
                      :wrapped boolean
                      :leftMarging integer
                      :topMargin integer
10                    :position position
                      :justification justification
                      :verticalJustification justification
                      :characterSpacing integer
                      :lineSpacing integer
15                    :rectangle rectangle
                      :foregroundColor color
                      :backgroundColor
              )

box

```
        USW 0218 PUS              -24-                        1197

(box
                itemAttributes
                :thickness integer
                :rectangle rectangle
 5              :foregroundColor color
                :backgroundColor color
            )

font
            (font
10              itemAttributes
                :name string
                :file fileNameRefnce
            )

graphic
15          (graphic
                itemAttributes
                :position position
                :rectangle rectangle
                file fileNameRefnce
20          )

video
            (video
                itemAttributes
```

```
                :position position
                :rectangle rectangle
                :file fileNameRefnce
                :loop boolean
5               :lastFrameStaysVisible boolean
                :keepResident boolean
            )

audio
            (audio
10              itemAttributes
                :file fileNameRefnce
                :loop boolean
                :keepResident boolean
            )

15      animation
            (animation
                itemAttributes
                :rectangle rectangle
                :file fileNameRefnce
20              :loop boolean
                :keepResident boolean
                framesPerSec integer
            )
```

USW 0218 PUS  -26-  1197

```
        list
                (list
                        itemAttributes
                        :rectangle rectangle
 5                      :positions ( Offset* )
                        :wrapCursor boolean
                        :wrapList boolean
                        :singleSelect boolean
                        :fixedCursor boolean
10                      :fixedCursorIndexinteger
                        :autoScrollMargin integer
                        :autoScrollCount integer
                        :hideDisabled boolean
                        :maxWhiteSpaceAbove integer
15                      :maxWhiteSpaceBelow integer
                        :itemTemplate ( listElement * )
                        :itemValues stringRefnce
                        :initialState stringRefnce
                )

20      listElement
                (       : ref itemNameString
                        : cond Condition
                        [: qual integer ]
                        [: offset Offset ]
25              )
```

USW 0218 PUS    -27-    1197

Condition is one of
    OnVisible
    OnVisibleIn
    OnCursor
    OnCursorIn
    OnCursorNot
    OnSelect
    OnSelectIn
    OnSelectNot
    OnEnable
    OnEnableIn
    OnDisable
    OnDisableIn
    OnToggle
    OnToggleNot
    OnWrapAbove
    OnWrapBelow
    OnWrap script
    (script
        itemAttributes
        actions actionList
    )

actionList

USW 0218 PUS                    -28-                        1197

```
            (
                [nameString stringReference ]*
            )

hilite
5           (hilite
                itemAttributes
                :item itemNameString
                :hilited boolean
                :action nameString
10              :actionParameters stringRefnce
            )

timerEventHandler
            (timerEvent
                itemAttributes
15              [:time integer ]
                [:ticks integer ]
                :eventType timerEventType
                :action nameString
                :actionParameters stringRefnce
20          )

buttonEventHandler
            (buttonEvent
                itemAttributes
```

```
USW 0218 PUS                   -29-                           1197

:button buttonID
                :eventType buttonEventType
                :index integer
                :action nameString
 5              :actionParameters stringRefnce
             )

streamEventHandler
         (streamEvent itemAttributes
             :stream itemNameString
10           :eventType streamEventType
             [ :marker integer ]
             :action nameString
             actionParameters stringRefnce
         )

15   compositeEventHandler
         (compositeEvent
             itemAttributes
             :eventType compositeEventType
             :action nameString
20           :actionParameters stringRefnce
         )

transition
         (transition
```

```
          itemAttributes
          :transitionType transitionType
          [:in boolean ]
          [:frames integer ]
          [:initialX integer ]
          [:initialY integer ]
     )

transitionType
     is one of: None, FadeBlack, Dissolve, Wipe, Slide,
Zoom library
     (library
          itemAttributes
          :file fileNameRefnce
          [:runtime boolean ]
     )

custom
     (custom
          itemAttributes
          customValue
     )

customValue is one of
```

```
USW 0218 PUS                    -31-                              1197

:data stringRefnce

:hexData stringRefnce

:dataFile fileNameRefnce value
 5       (value
              itemAttributes
              text stringRefnce
          )

textInput
10       (textInput
              itemAttributes
              :textValue stringRefnce
              :font itemNameString
              :inputType numeric | alphaNumeric
15            :password boolean
              :charSpacing integer
              :foregroundColor color
              :backgroundColor color
              :cursorColor color
20            :rectangle rectangle
              maximumLength integer
          )

infoItems
```

USW 0218 PUS                      -32-                              1197

```
        (infoItem * )

infoItem (:string string )

itemNameString 5              nameString boolean is one of: true or false.

integer is an integer 10  fileNameRefnce is one of: filename fileNameItem stringRefnce is one of: string stringItem overrideType 15        is one of: extend, replace nameString string must not contain spaces or special characters.
```

```
fileNameItem
     is a value item name preceded by a '@' - all
     enclosed within double quotes.

strinItem
5    is a value item name preceded by a '@' - all
     enclosed within double - quotes.

Offset
     (hOffset vOffset )

hOffset
10    integer vOffset
     integer color
     ( red green blue )

15   red
     integer green
     integer
```

USW 0218 PUS         -34-                    1197 blue
    integer buttonID
    is one of: ButtonMap, ButtonGuide, ButtonVideo,
        Button0, Button1, Button2, Button3, Button4,
        Button5, Button6, Button7, Button8, Button9,
        ButtonUpChannel, ButtonDownChannel,
        ButtonLastChannel, ButtonExit, ButtonInfo,
        ButtonSelect, ButtonPrevious, ButtonNext,
        ButtonPower, ButtonRewind, ButtonPause,
        ButtonFastForward, ButtonMute, ButtonUpVolume,
        BuKonDownVolume, ButtonLeft, ButtonRight,
        ButtonDown, ButtonUp buttonEventType
    is one of: ButtonPressed, ButtonStillDown,
    ButtonReleased streamEventType
    is one of: StreamStart, StreamEnd, StreamMarker compositeEventType
    is one of EnterComposite, ExitComposite timerEventType

```
            is one of: TimeDelay UserDelay transitionType is one of: None, FadeBlack, Dissolve, Wipe justification is one of: left, center, right, top, bottom position (left top)

rectangle (left top right bottom )

thickness integer left integer top integer right integer
```

```
bottom
    integer compositeName
    string string
    is a character string. It must be enclosed within
    double quotes.
```

What is claimed is:

1. For use in a multimedia application development computer system, a method for describing functionality of a multimedia application for use on an interactive network employing a client-server architecture, the method comprising:

receiving signals via the computer system, the signals representing a plurality of composites;

storing the plurality of composites in ASCII text file, each composite having a plurality of composite items including audio and video, each composite describing a sequence and a position of a plurality of multimedia assets to be executed by a player wherein the composite description includes at least one internal event handler used by the player to transition to different composites and modify the composite items in a composite when an interval event occurs, at least two of the plurality of composites being linked by an action.

* * * * *